United States Patent Office 3,416,103
Patented Dec. 10, 1968

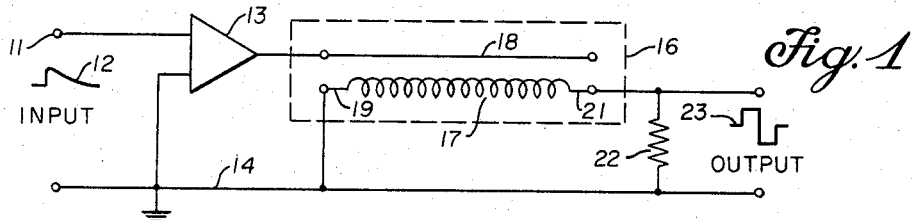
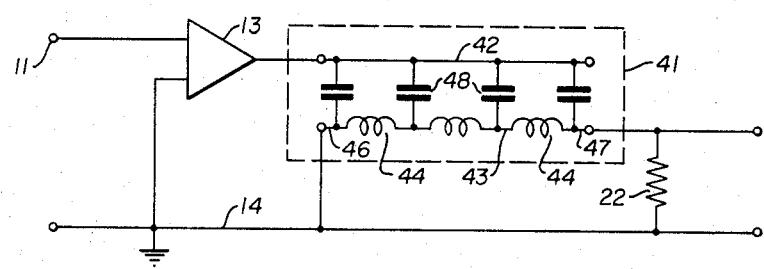
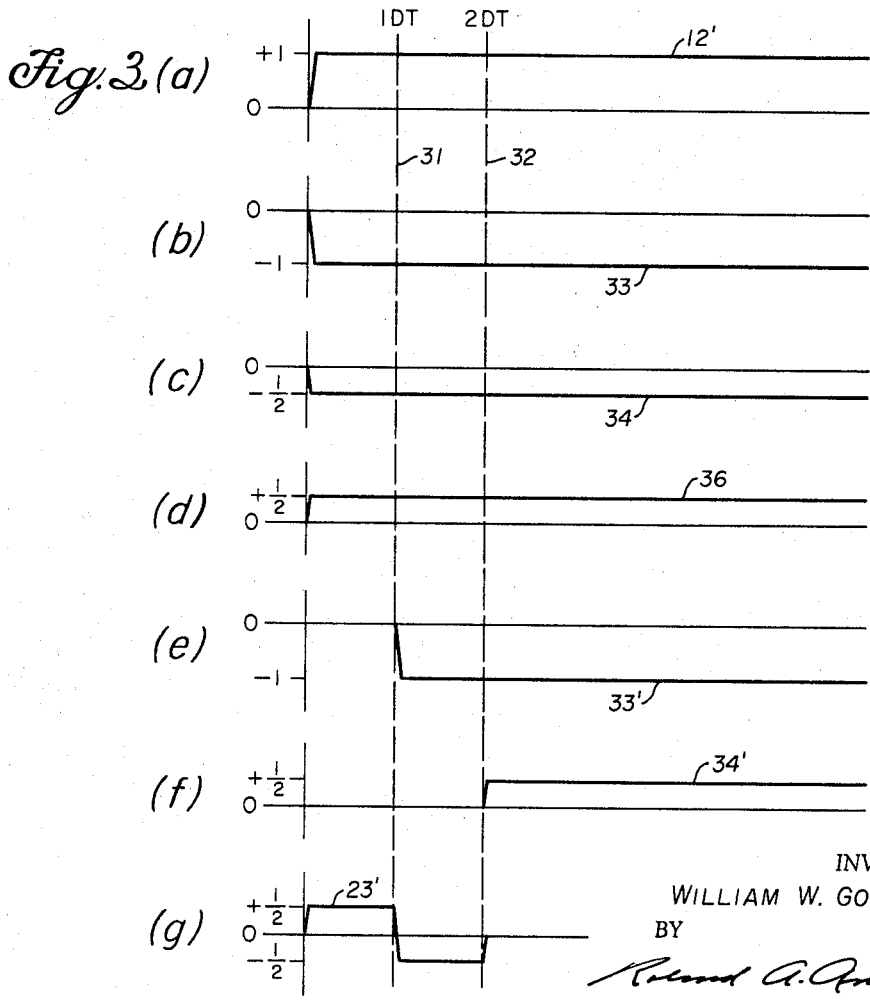

3,416,103
ELECTRONIC PULSE LINE FOR PRODUCING SYMMETRICAL SQUARE-TOPPED PULSES
William W. Goldsworthy, Orinda, Calif., assignor to the United States of America as represented by the United States Atomic Energy Commission
Filed Apr. 5, 1966, Ser. No. 540,421
5 Claims. (Cl. 333—20)

ABSTRACT OF THE DISCLOSURE

An electronic pulse line for producing a symmetrical square-topped output signal from a step pulse input signal. The input pulses are applied to the shield or common side of a pulse delay line while output signals are taken from an inner conductor capacitively coupled to the shield. With the input end of the inner conductor grounded and the output side terminated in the characteristic impedance of the pulse line, the various pulses and reflected pulses combine at the output to provide the desired waveform.

This invention relates generally to electronic pulse circuitry and more particularly to a pulse line circuit for shaping an asymmetrical input pulse into a symmetrical output pulse. The invention described herein was made in the course of, or under, Contract W-7405-eng-48 with the United States Atomic Energy Commission.

In pulse circuits, it is frequently necessary to make an accurate determination of the exact moment at which pulses start, that is, from input pulses of indeterminate length it is necessary to produce timing signals which have a definite time relationship to the start of the input pulses. Such timing signals may then be measured and compared to obtain useful information, as for instance, in measuring and analyzing of nuclear events. It has been found that the preferred timing signal is one which has a symmetrically shaped, square-topped waveform. At the midpoint of such a signal, the polarity of the timing pulse signal rapidly reverses, the waveform rapidly crossing a zero reference level. The exact moment when a pulse passes through a zero value is relatively easy to detect in subsequent timing circuitry. Thus, it has been standard procedure in many timing circuits to produce such a symmetrical square-topped waveform. The usual means of producing such a pulse requires the use of two separate pulse clipping stages with the attendant problems associated with the necessary matching of the two stages.

The present invention uses a single clipping line or delay line so that there is no problem of electrical matching with another clipping stage. Also, cost and size of the apparatus is reduced in comparison to previous pulse shapers by eliminating one clipping line stage. In the present invention, the term clipping line is defined either as a lumped constant type delay line utilizing multiple units of inductors and capacitors or as a distributed type delay line such as a coaxial transmission line having either a straight center conductor or a helical center conductor or coil. When, for instance, the latter type is used in the present invention, one end of the center conductor is grounded and the other second end is terminated in the characteristic impedance of the transmission line.

Input pulses are applied to the shield or common side of the delay line and capacitively applied from the shield to the center conductor. Output pulses are obtained across the characteristic impedance termination, the duration of output pulses being equal to twice the delay time of the clipping line with the pulse passing through the zero level after a time equal to such delay time.

It is an object of the present invention to provide a simplified means for producing a symmetrical square-topped pulse.

It is another object of the present invention to provide an improved pulse shaper in which total signal losses are minimized.

It is another object of the present invention to provide a pulse shaper having a lower fabrication cost than previous pulse shapers but providing an identical type of output pulse shape.

It is another object of the present invention to provide a pulse shaper in which line termination problems are reduced.

It is another object of the present invention to provide a pulse shaper producing a symmetrical square-topped output pulse in which only a single clipping stage is required.

The invention will be better understood by reference to the following specification taken together with the accompanying drawing of which:

FIGURE 1 is a circuit diagram of the invention,
FIGURE 2 is a circuit diagram of another embodiment of the invention, and
FIGURES 3a to 3g are waveforms of various signals occurring in the circuits of FIGURES 1 and 2.

Referring now to FIGURE 1, there is shown an input terminal 11 to which is applied input pulses which typically have a fast rising waveform with a long tail as indicated in an input signal waveform 12. Such a pulse may typically have a length in the order of 50 microseconds. However, in the short time scale at which the present invention is generally operated, such signal 12 may be considered effectively a positive step input signal. Such input signal 12 is amplified in a driver amplifier 13 which is characterized by having a very low output impedance with respect to a circuit ground 14. A distributed type clipping line 16 is shown having a typical delay time of one microsecond and having a helical winding 17 surrounded by a shield 18. Output signals from the amplifier 13 are applied to the shield 18 while a first end 19 of the helical winding 17 is connected to circuit ground 14 and a second end 21 of the winding 17 is connected through an impedance 22 to ground 14. The impedance 22 is matched to the characteristic impedance of the clipping line 16. The desired output signals are developed across the impedance 22, such output signal having a square-topped symmetrical waveform 23 with a total duration of two microseconds which is equal to twice the delay time of the line 16. An output terminal 24 is provided at end 21 and is generally connected to circuitry for detecting the rapid change in polarity in the output signal 23.

A lumped constant type of delay line 41 is shown in FIGURE 2 instead of the distributed type 16 shown in FIGURE 1. A common side 42 of the lumped constant line is connected to the output of the amplifier 13. The other line 43 containing series connected inductance coils 44 is grounded at one end 46 and terminated at the other end 47 across the characteristic impedance 22, in the same manner as the helical winding 17 described. A plurality of capacitors 48 are connected from common side 42 to the ends of each inductance coil 44.

Considering now the operation of the invention, with respect to FIGURE 1 particularly, assume that an input signal 12 has been applied to the input terminal 11. Such signal 12 appears at the output of amplifier 13 and is applied to the shield 18. The amplified signal from amplifier 13 has the same waveform as the input signal 12. In FIGURE 3a, the waveform of such amplified input signal 12' is shown on a lengthened time scale. A signal delay time period equal to the delay time of line 16 from the start of the signal 12' is indicated in FIGURES 3a to 3g by a dashed line 31 and two delay times are indicated by a dashed line 32. The relative amplitudes and polarities of the various signals are indicated along the ordinate axes while time is taken along the abscissa axes. The circuit arrangement provides line driving to both ends of the line 19 and 21 simultaneously. A negative step waveform 33 in FIGURE 3b is created at end 19 of the line 17 with respect to the shield 18 and is thus the inverse of amplified input signal 12' as shown in FIGURE 3a.

At the end 21 of the winding 17, the amplified input signal 12' is divided essentially equally across the line 16 and the impedance 22, which has an impedance equal to that of the line 16. The waveform 34 of the signal developed at end 21, shown in FIGURE 3c, taken with respect to the potential of the shield 18, is a negative signal of one-half the amplitude of input signal 12'. The waveform 36 of the signal developed across impedance 22, shown in FIGURE 3d, taken with respect to circuit ground 14, is positive with an amplitude equal to one-half the input signal 12'. The signal 33 at first end 19 propagates down the line 16 toward second end 21 while signal 34 at second end 21 propagates down the line 16 toward first end 19.

The desired symmetrical output pulse 23 is the resultant of various signals developed across the impedance 22, the times at which signals 33 and 34 appear across impedance 22 being shown in FIGURES 3e and 3f, respectively. Signal 33' is shown in FIGURE 3e as it appears across impedance 22, and is signal 33 delayed by one delay time 31. Signal 34', shown in FIGURE 3f, appears across impedance 22 after having been reflected and reversed in polarity as result of the ground connection at first end 19. Such signal 34' is signal 34 delayed by two delay times 32. The various signals appearing across impedance 22 add together to form a resultant symmetrical, square-topped signal 23' as shown in FIGURE 3g.

With ideal line conditions and ideal drive conditions with a step-wave-form drive input signal 12', the voltage 36 developed during the first time period 31 across the impedance 22 will be half the amplitude of the input signal 12', flat-topped, and with fast-rise. At the end of the first time period 31 of the line, the full-amplitude reverse-polarity signal 33', entering from the grounded end 19 of the line 17, arrives at the output end 21 of the line, adding to the half-amplitude signal 36 already present across the impedance 22. From delay time 31 to 32 the resultant signal 23' is a signal of reverse polarity and of an amplitude equal to one-half of the original driving signal 12'. The other signal 34, which entered from the output end 21 of the line 17, after one delay time 31 arrives at the line end 19, which is shunted by the low-impedance driver stage, and since the impedance is close to zero the polarity of signal 34 is reversed at the same time that it is reflected back toward the opposite end of the line 21. At the end of the second time period 32, the reflected half-amplitude inverted signal 34' arrives at the output end 21 of the line and adds to those signals already present across impedance 22 to restore the output amplitude of signal 23' to zero. In this manner a symmetrically shaped line-clipped pulse 23' is developed with only a single line 16.

While the invention has been disclosed with respect to a particular embodiment, it will be apparent to those skilled in the art that numerous variations and modifications may be made within the spirit and scope of the invention and it is not intended to limit the invention except as defined in the following claims.

What is claimed is:

1. In an electronic pulse shaper for converting input pulses into output pulses which rapidly cross a predetermined reference potential, said input pulses being obtained from a first terminal of a source which has a second terminal at said reference level, the combination comprising a transmission line having a first inductive conductor and a second conductor capacity coupled at a plurality of points to said first conductor, said second conductor being connected to said first terminal, a first end of said first conductor being connected to said second terminal, and a circuit element having an impedance equal to the characteristic impedance of said transmission line and connected from the second end of said first conductor to said second terminal.

2. A pulse shaper as described in claim 1 wherein said first conductor is a helical coil and wherein said second conductor is a conductive shield disposed around said helical coil.

3. A pulse shaper as described in claim 1 further comprised of an amplifier coupled between said first terminal and said second conductor for receiving said input pulses and having an output connected to said second conductor and being of the class having a low output impedance.

4. A pulse shaper as described in claim 1 wherein said first conductor is comprised of a plurality of series connected inductive elements and wherein capacitive elements are connected from said second conductor to said first conductor at the ends of said inductive elements.

5. In a pulse shaper for producing a symmetrical output signal from a step input signal, the combination comprising an input amplifier having an input terminal and output terminal and a circuit ground connection, said amplifier being of the class having a very low output impedance, a delay line with a characteristic impedance and having a shield connected to said output terminal of said amplifier and having a helical coil enclosed by said shield, a first end of said coil being connected to said circuit ground connection, and an impedance equal to the characteristic impedance of said delay line connected from a second end of said coil to said circuit ground connection, whereby said symmetrical output signal is obtainable across said impedance.

References Cited

UNITED STATES PATENTS

| | | | |
|---|---|---|---|
| 2,465,840 | 3/1949 | Blumlein | 333—20 |
| 2,619,537 | 11/1952 | Kihn | 333—31 |
| 3,345,587 | 10/1967 | Hayworth et al. | 333—20 XR |

OTHER REFERENCES

"The Use of Delay Networks in Pulse Formation," White, The Journal of the Institution of Electrical Engineers, vol. 93, Part IIIa, No. 1, 1946, pp. 312-314.

"Millimicrosecond Pulse Techniques," by Lewis and Welles, Pergamon Press, New York, 1959, pp. 104 to 107, and plate page containing FIGS. 3.14 and 3.15.

HERMAN KARL SAALBACH, *Primary Examiner.*

M. L. NUSSBAUM, *Assistant Examiner.*

U.S. Cl. X.R.

333—31; 307—106